Patented Mar. 5, 1946

2,395,987

UNITED STATES PATENT OFFICE 2,395,987

PROCESS FOR FORMING A FIBROUS RUBBER BASE

Grover C. Berryman, Los Angeles, Calif.

No Drawing. Application November 7, 1942, Serial No. 464,922

1 Claim. (Cl. 260—717)

This invention relates to a method of reconditioning vulcanized rubber fiber waste for forming a fibrous rubber base material.

The primary object of the invention is to provide an economical process for forming a combined rubber and fiber composition from tire carcasses and whereby worn out and discarded fabric reinforced rubber tires may be salvaged and the fabric cord component thereof conserved in conjunction with the vulcanized or cured rubber constituent of the carcass in a fashion to form a fibrous rubber product constituting a base material which is subject to the various processes and treatments employed in adapting reclaimed rubber to the various uses to which it is put.

Another object is to provide a process of the above character which involves but a few simple steps, which can readily be carried into effect, and which can be practiced with ordinary equipment.

Another object is to provide a process for reclaiming the rubber and fabric constituents of the rubberized fabric portions of tire carcasses in which the use of caustic soda, acids, or other chemicals capable of affecting the fibers of the fabric is dispensed with.

It has heretofore been common practice to reclaim the cured rubber of old tire carcasses by what is known as the alkaline process in which the fabric component of the tire carcass is destroyed so as to result in a reclaimed rubber entirely free of fiber content, whereas by my present method hereinafter set forth the fabric content of the tire carcass is preserved in a finely divided state and the resultant reclaimed rubber product is characterized by a fibrous content and constitutes a base material which may be designated as felted rubber.

It has also heretofore been contemplated to utilize tire carcasses (from which the tread and side walls have been removed) in the preparation of rubber products by granulating or shredding the rubber stripped carcass and then plasticizing the resultant mass of cured rubber and fibers in the presence of dilute solutions of an alkali such as caustic soda. It is well known to those skilled in the art that alkali and particularly caustic alkali is highly destructive of the cellulosic material constituting the fibrous constituent of tire carcasses, and accordingly it is highly desirable that the use of caustic alkali be dispensed with in processes of this character where the fibers are to be retained so as to insure preservation of the strength and bonding properties of the fibers.

The present invention contemplates the disintegration of rubber stripped tire carcasses (known in the art as carcass stock) and their reduction to a finely comminuted state whereby the cured rubber constituent will be reduced to a pulverulent form and the cellulosic fiber content will be reduced to a substantially powdered or flocculent state, and then plasticizing the mass and effecting devulcanization of the cured rubber content solely by addition to the powdered mass by intergrinding therewith of a suitable rubber softener followed by the employment of heat and pressure to produce a soft pastey mass of rubber containing the undegenerated fibrous material of the disintegrated tire carcasses, which mass can be molded, sheeted, etc. with or without the addition of raw rubber, extenders, fillers, etc. and which may be vulcanized by the use of vulcanizing agents such as powdered sulphur.

In carrying out the process fabric reinforced rubber tire carcasses to be employed in the production of the product are first stripped of all, or nearly all, superimposed cured rubber constituting the tread and side wall portions, thus producing the desired carcass stock; the superimposed cured rubber being removed from the fabric core of the carcass by buffing which reduces such cured rubber to a finely divided or comminuted state. The resultant powdered cured rubber may be reclaimed in conventional fashion to produce the ordinary reclaimed rubber of commerce, but which in its dry pulverulent state may be mixed with the material reclaimed in the hereinafter described process.

The stripped fabric portion of the tire carcass or carcass stock, which comprises a mass of fibrous cords embedded in rubber, is first reduced to a coarse granular state by passing through a suitable mill in a dry state resulting in a mass consisting of small dry chunks about the size of peas and which chunks are composed of short lengths of fabric fibers bound in cured rubber. The dry granular mass thus obtained is then subjected to a refining action, which consists in grinding the small chunks in a dry state to reduce the material to a pulverulent or flocculent form thereby producing a fine dry powder or floc composed of fine particles of cured rubber and fine particles and minute lengths of fiber.

The rubber and fiber powder is then interground with a volume of a liquid rubber softener of only sufficient quantity in proportion to the dry particles of the powder that when each particle of the mass absorbs its quota of the softener it will remain in its general granular form but will be slightly moistened such that under slight pressure the particles will adhere together in chunk or cake-like form.

A proportion of approximately 20% of the liquid softener by weight to the powdered mass under treatment has been found in some instances to produce a satisfactory result, but such proportion is not critical and is subject to considerable variation; the amount of softener used in proportion to a given quantity of the powdered cured rubber and fiber being varied according to the quality of the powder as to the "life" of the cured rubber constituent, and as to the proportion of extenders, fillers, sulphur, and other foreign materials as may be incorporated in the carcass stock during the initial manufacture thereof. The proportion of the softener may also be varied according to the kind and quality of the fibrous base product desired. For example, I have found that in some instances less than 15% of the softener by weight of the powdered mass will be adequate while in another instance as much as 30% of the softener was required. In any case, the proportion of softener employed to any given quantity of the powder will be sufficient to be absorbed by the cured rubber constituent and to effect devulcanization thereof and at the same time effect moistening of the fiber constituent.

The intergrinding of the powder and the softener is preferably effected at a temperature of about 200° F. or at some temperature slightly below boiling, and for such length of time as to insure thorough impregnation of the powder with the softener. The stated temperature at which the intergrinding is effected is subject to variation and is not critical, it only being essential that a temperature sufficiently high to effect destruction of the fine fibers or decomposition of the mass be not used and yet be sufficiently high to insure thorough impregnation of the rubber particles by the softener.

While this intergrinding of the rubber-fiber powder with the liquid softener may be effected in any suitable manner and by any suitable means, the employment of a mixing mill equipped with friction rollers running in sliding contact with each other in opposite directions but at different speeds, is preferable. In the operation of a mixing mill of this character, the rollers become heated by friction generated by reason of their relative movement in sliding contact with each other, and accordingly the mill is run idle for a sufficient length of time to bring the rollers to a desired temperature before feeding the material thereto. On the rollers being thus heated to a requisite temperature a measured batch of the rubber-fiber powder in a warmed condition, preferably freshly ground and heated by the action of friction in the pulverizing operation, is fed to the friction rollers together with a measured quantity of the liquid softener which latter is poured into the powdered mass while in a heated condition at a temperature slightly less than boiling. In heating the softener it is placed in a kettle fitted with a steam coil and is there brought to the desired temperature a little less than boiling, which renders the softener very thin so that when it is ground hot into the rubber-fiber powder in the mill the liquid and powder will be readily intermixed. However, in order to insure thorough dispersion of the oil throughout the mass of powder particles, the mass is repeatedly run through the mill as many times as occasion may require and as may be determined necessary by the operator.

The treatment above recited results in a mass of loose, granular but moist particles of rubber and fiber which can be formed in chunks or cakes on being subjected to light pressure.

The liquid softener used may be of the oils or tars commonly employed as rubber softeners and in the production of rubber-like substances including, for example, vegetable oils such as cotton-seed oil, linseed oil, rape-seed oil, soy-bean oil, castor oil, sesame oil, corn oil, and the like; or animal oil such as whale oil, fish oil, cod-liver oil and the like; or a mineral oil such as crude petroleum, or a number of its distillates, or common road-oil thinned with distillate; or tars derived from the distillation of wood or peat. Either an oil or tar may be used, or a mixture of oil and tar may be employed. I have found in practice that the use of pine-tar alone as a softening agent gives highly satisfactory results, and because of this and its availability and low cost as well as the facility with which it can be handled and applied and the better quality of product obtained, is preferable to the other softeners mentioned.

I am aware that oils and/or tars have been heretofore commonly employed as rubber softeners and devulcanizing agents and accordingly I do not claim such use as being my invention; my process embodying the use of such materials for the purpose to which they are ordinarily put in reconditioning vulcanized rubber, but in a new fashion and such as to preserve finely comminuted fabric particles incorporated in and with the cured rubber being devulcanized.

The granular softener impregnated particles of rubber and fiber without the addition of other substances are then arranged on a suitable tray and slightly compressed to form a layer of approximately three or four inches in thickness. The mass is then subjected to the action of heat and pressure such as in saturated steam under a pressure of approximately 100 pounds for a period of about four hours whereby the materials are cooked at a temperature of about 338° F. and are thereby converted into a homogeneous, soft, spongy, pliable mass. This cooking operation is effected in a suitable autoclave. The spongy mass thus obtained is then rolled into a thin sheet or ribbon having a wafer-like thickness approximating that of a sheet of tissue paper or writing paper, which ribbon is then wound on a drum until the overlying layers acquire a thickness of one inch or thereabout, whereupon the resultant cylinder of layers is cut lengthwise and removed from the drum and flattened out to form a sheet or slab constituting the finished product; the superimposed layers of the wafer-like ribbon adhering together under their inherent cohesiveness and forming a homogeneous pliable body at normal atmospheric or room temperatures. This rolling of the mass into thin sheets and assembling the sheets in a slab insures thorough distribution of the rubber and fiber particles throughout the slab and thereby results in a uniform product.

The product resulting from the foregoing process constitutes a base material comprising a fibrous rubber, or felted rubber, and is ready for use. It may be reground for sheeting purposes and may be vulcanized by the use of vulcanizing agents such as powdered sulphur. It may be employed with or without the addition of crude rubber, or extenders such as factice, or reclaimed rubber, and may be admixed with clay, accelerators, nonoxydizing agents, etc. according to the character of the manufactured product desired.

The base material is especially suitable for use in forming floor coverings, shingles, and the like, and may be also used as a gasket material, as well as for the various uses to which reclaimed rubber is put, such as in retreading tires and the manufacture of rubber heels and soles for shoes. It may be converted into hard slabs by addition of clay, diatomaceous earth, and other hardening substances. It may be rolled into flexible sheets. It may be mixed with nonoxydizing agents, coloring materials, and petroleum tar. Various other substances may be incorporated therein such as cork, sawdust, and the like. The powdered cured rubber obtained from the treads and side walls of the tire carcasses is admirably suited for use with the base material without further treatment, and may be vulcanized in the mass with the addition of sulphur. The base material may be used in its natural state for insulation purposes especially where interposed between walls. It may be "cured" or "semi-cured" by subjecting it to the action of heat. It may also be employed as a cushioning material. In fact the product is subject to a wide range of uses and various treatments comparable to that of reclaimed rubber with the advantage, however, of being superior to reclaimed rubber in many instances by reason of its fibrous or felted character.

An important and the essential feature of this invention is the retention in the product of the fibrous content of the carcass stock subjected to treatment in a completely undegenerated state, which is accomplished by eliminating in the processing of the stock the use of any fiber destroying or cellulose deteriorating substances such as caustic alkali; the retained fibers serving to increase resistance to wear and resistance to oxidation of articles manufactured from the product.

This application is a continuation of an application Serial Number 413,980 filed by me under date of October 7, 1941.

I claim:

The process which consists in reducing the rubber bound fabric of tire carcass stock to a flocculent state, intergrinding with the resultant powder a quantity of pine-tar while heating the mass to a temperature slightly less than boiling, the quantity of pine-tar being proportioned to the quantity of powder such that when interground therewith the powder will remain in moist granular form, forming the resultant mass of moist granules into a slightly compressed layer, and cooking the layer in steam at a temperature of about 338° F. and under a pressure of about 100 pounds for about four hours.

GROVER C. BERRYMAN.